June 3, 1958  J. N. EDWARDS  2,837,665
ELECTRO-MECHANICAL VOLTAGE DIFFERENTIAL DETECTOR
Filed Dec. 31, 1956  3 Sheets-Sheet 1

INVENTOR.
JAMES N. EDWARDS,
BY
AGENT.

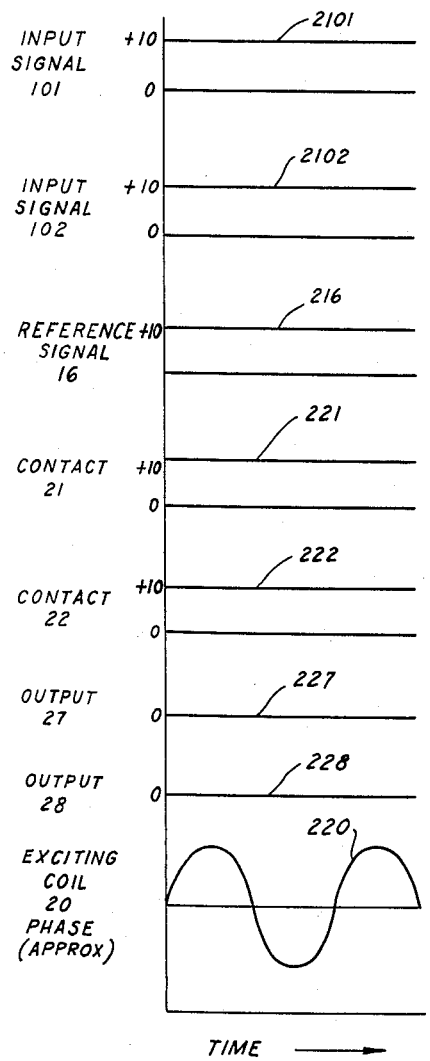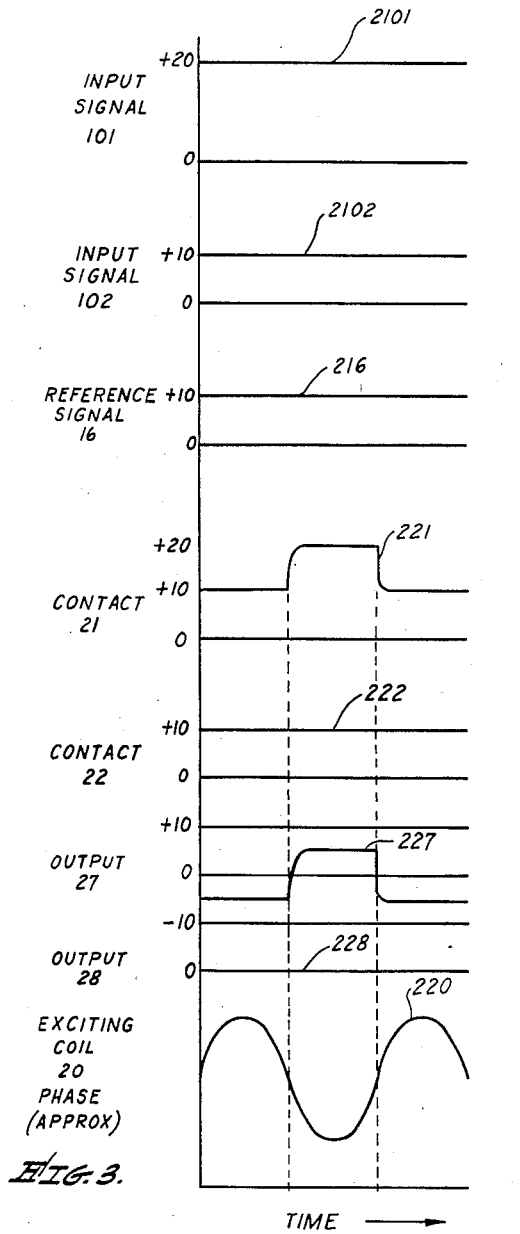
FIG. 2.
FIG. 3.
INVENTOR.
JAMES N. EDWARDS.

June 3, 1958  J. N. EDWARDS  2,837,665
ELECTRO-MECHANICAL VOLTAGE DIFFERENTIAL DETECTOR
Filed Dec. 31, 1956  3 Sheets-Sheet 3

INVENTOR.
JAMES N. EDWARDS.
BY
AGENT

United States Patent Office 2,837,665
Patented June 3, 1958

2,837,665

ELECTRO-MECHANICAL VOLTAGE DIFFERENTIAL DETECTOR

James N. Edwards, Los Angeles, Calif., assignor to Hughes Aircraft Company, Culver City, Calif., a corporation of Delaware Application December 31, 1956, Serial No. 632,623

10 Claims. (Cl. 307—149)

The present invention relates to differential detectors, and more particularly to an electro-mechanical voltage differential detector for receiving a plurality of input signals and a reference signal and producing an output signal proportional to the difference in amplitude between the maximum deviating input signal and the reference signal and indicative of the relative polarity of the maximum deviating input signal.

In applicant's Patent 2,728,866, entitled "Electro-Mechanical Voltage Differential Detector," there is disclosed a novel voltage differential detector which is adapted to receive two input signals, one of which may be regarded as a reference signal, and producing an output signal which is proportional to the instantaneous voltage differential between the two input signals, and also indicative of the relative polarity of the two input signals. While admirably suited for the comparison of a single voltage with a reference voltage, the circuit of applicant's patent cannot be readily extended to provide for the comparison of a plurality of signals with the reference signal, without unduly multiplying the structure required.

It is therefore an object of the present invention to provide an electro-mechanical differential detector for receiving a plurality of input signals and a reference signal and producing an output signal which is proportional to the instantaneous voltage differential between the maximum deviating input signal and the reference signal, and is also indicative of the relative polarity of the maximum deviating signal with respect to the reference signal.

A further object of the present invention is to provide a voltage differential detector for simultaneously comparing a plurality of input signals with a reference signal, which provides high impedance isolation between all input signals.

Another object of the present invention is to provide a voltage differential detector for receiving a plurality of input signals and a reference signal, simultaneously comparing the input signals with the reference signal and indicating on one of two output terminals the relative amplitude of the maximum deviating input signal from the reference signal, the circuit being simple, reliable and requiring a minimum of elements for its mechanization.

A voltage differential detector, according to the present invention, comprises a first pair of input terminals for receiving a first input signal to be compared to a reference signal, a pair of oppositely-poled diodes connecting one input terminal to an end of each of a pair of load devices and a pair of output circuits, each including a capacitor interconnecting the remaining end of each of said load devices and ground. A single-pole, double-throw electro-mechanical switch is provided for alternately applying the reference potential between the remaining end of one and the other of said load devices and ground. An output terminal is interconnected with each of the output circuits, and the amplitude of the signal appearing thereon is proportional to the voltage differential between the input signal and the reference signal, while the terminal upon which the output signal appears will be indicative of the relative polarity of the two signals. The comparison circuit thus described may be readily extended to provide for the simultaneous comparison of a plurality of input signals with the reference signal by providing an additional pair of input terminals for each additional signal to be compared and an additional corresponding pair of unidirectional conductive devices such as diodes interconnecting one of the input terminals and an end of each of said first and second load devices. Each of the additional diodes should be poled so that corresponding poles of all diodes are connected to the same load device. Such a mode of connection results in comparative isolation of all of the input signal sources, since input terminals are interconnected only through pairs of oppositely connected diodes, thereby providing high impedance isolation for signals of either polarity.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figs. 2, 3 and 4 are diagrams of wave forms of signals appearing in the circuit of Fig. 1 in operation;

Figure 1:
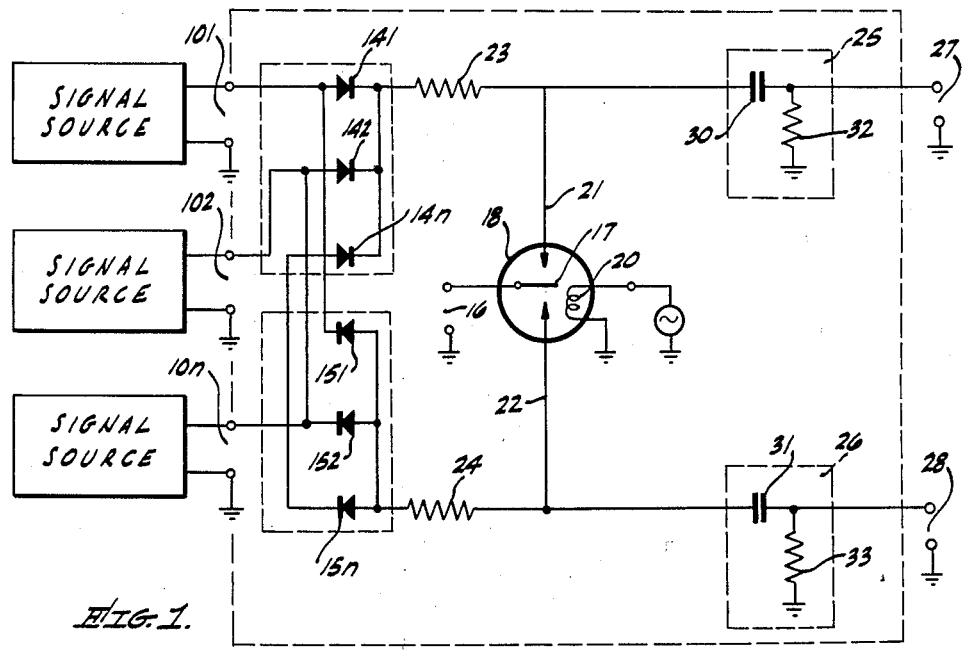
Fig. 1 is a circuit diagram of an embodiment of the voltage differential detector of the present invention.

Referring now to the drawings wherein the same reference characters designate the same or similar elements in the several figures, there is shown in Fig. 1 an electro-mechanical voltage differential detector, according to the present invention, comprising a plurality of input terminals 101, 102, 10n for receiving applied input signals from a corresponding plurality of input signal sources and a pair of input terminals 16 for receiving a reference signal from a source of reference signals. Each of the input signal sources and the reference signal source should embrace a common point of reference potential such as ground. The signals from each of the sources may be positive D. C. (direct-current) voltages, negative D. C. voltages, A. C. (alternating-current) voltages, or any combination thereof. Each of the input terminals 101, 102, 10n is connected to one end of a first load resistor 23 by means of a plurality or group of unidirectional conducting devices or diodes 141, 142, 14n and to one end of a second load resistor 24 by means of a second group of diodes 151, 152, 15n. The diodes of each group should all be poled to conduct in the same direction, while the two groups should be arranged to conduct in opposite directions between the input terminals and the different load resistors to which they are connected.

One of the input terminals 16 is connected to the switch arm 17 of a single-pole double-throw electro-mechanical switch 18 whose driving coil 20 is energized by alternating current as indicated, having a suitable amplitude and frequency. Switch arm 17 is arranged to alternately contact fixed contact points 21 and 22, respectively, as the arm vibrates in synchronism with the current in coil 20. Fixed contact 21 is connected to the remaining end of load resistor 23, while fixed contact 22 is similarly connected to the remaining end of load resistor 24.

While contacts 21 and 22 may be regarded as output terminals of the circuit, components of the input signals, other than the desired differential output signal appear at each of these points. A variety of output coupling networks may be utilized to interconnect each of contacts 21 and 22 to other electrical devices where it is desired to eliminate such components of the output signals. Thus, for example, a pair of coupling networks indicated by dotted boxes 25 and 26 may be utilized to couple each of contacts 21 and 22 to a pair of output terminals 27 and 28, respectively. Each of coupling networks 25 and 26 includes a capacitor 30 or 31 connected between contact 21 and output terminal 27, and between contact 22 and output terminal 28 for blocking direct current, and a resistor 32 or 33 connected between each output terminal and ground across which the differential output signal is developed.

Figure 4:
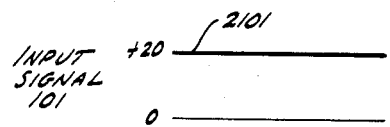
Figure 4:
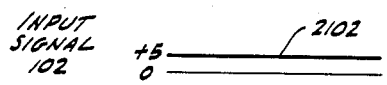
Figure 4:
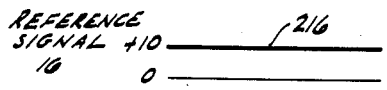
Figure 4:
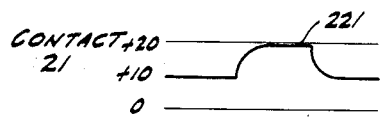
Figure 4:
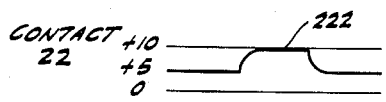
Figure 4:
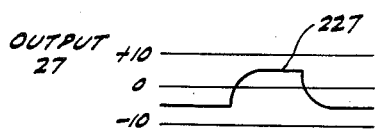
Figure 4:
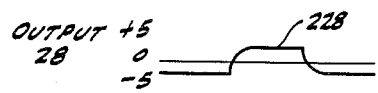
Figure 4:
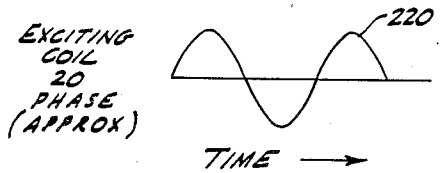

In order to better illustrate the operation of the present invention, there is depicted in each of Figs. 2, 3 and 4 a diagram of wave forms of signals appearing in the circuit of Fig. 1 in operation, the amplitude of each signal being indicated as the ordinate while time is depicted as the abscissa. Each wave form has a number corresponding to the reference number of the point at which the signal appears in the circuit of Fig. 1 preceded by the numeral 2, it being understood that the signals shown in each of the figures are those for the depicted input signal conditions. In each of Figs. 2, 3 and 4, only two input signals will be compared to the reference signal, but as will be explained more fully hereinafter, the structure of the present invention may be readily extended to provide for the comparison of any number of input signals, the mode of operation being substantially equivalent to that described for two input signals. Referring now to Fig. 2, it will be assumed that the signal applied to input terminal 101 is a D. C. voltage, 10 volts positive with respect to ground, and numbered 2101, that the signal applied to input terminal 102 is a D. C. voltage, 10 volts positive with respect to ground, and numbered 2102, and that the reference signal applied to input terminal 16 is a D. C. voltage, 10 volts positive with respect to ground, and numbered 216.

Considering now the response of the circuit of Fig. 1 to these input signals and the energizing of driving coil 20 by means of the current depicted as wave form 220, it will readily be recognized that the alternate movement of contact arm 17 between fixed contacts 21 and 22 will apply the reference potential to each of output circuits 25 and 26 in succession. If the time constant of each of these output circuits is relatively short, each of capacitors 30 and 31 will quickly charge to the reference potential during the periods the contact arm 17 is contacting their corresponding contact points 21 or 22. During periods in which the contact arm is not contacting a particular contact point, the corresponding output circuit will form a series circuit including the corresponding load resistor such as 23, the diodes such as 141, 142 connected to such load resistor and the input signal sources connected to the input terminals. The flow of current through the load resistor, and the voltage developed across each of resistors 32 and 33 during the latter periods will be determined by the relative amplitudes and polarity of the input sources and the reference source and the direction of conduction of the two groups of diodes. For diodes poled as shown in Fig. 1, it will readily be recognized that a current can flow through the load resistor 23 when the arm 17 is not contacting contact 21 only if one of the input signal sources is more positive than the reference source, while a current can flow through resistor 24 when arm 17 is not contacting contact 22 only when one of the input signal sources is less positive than the reference source.

Under the conditions of input signal, depicted in Fig. 1, when arm 17 contacts contact 21, the reference potential will be applied across the serial circuit comprising capacitor 30 and resistor 32 and the capacitor will quickly charge to the reference potential. During the periods in which contact arm 17 is contacting contact 22, capacitor 31 will be similarly charged. During the periods in which arm 17 is not contacting contact 21, the charge previously stored on this capacitor 30 will, or will not, flow through resistor 23 depending on the relative polarity of the diodes comprising diode group 141 to 14n and the relative polarity of the input signal applied to each of the input terminals. Since for the conditions of input signal amplitude and polarity depicted in Fig. 1, capacitors 30 and 31 will not be discharged due to the absence of potential difference between the input signal sources and the reference potential, no current will flow in either of resistors 23 or 24 and zero output potential will appear at each of terminals 27 and 28 as depicted by wave form 227 and 228 in Fig. 2, indicating the condition of voltage identity between the input signal sources and the reference source previously assumed.

Referring now to Fig. 3, there are depicted wave forms similar to those of Fig. 2 except that the input signal applied to input terminal 101 is now assumed to be 20 volts positive as shown by curve 2101, while the input signal applied to input terminal 102 is assumed to be 10 volts positive as illustrated by curve 2102. The reference potential is again taken as 10 volts positive as indicated by curve 216. When arm 17 engages contact 21, the potential of contact 21 will be established at 10 volts positive and capacitor 30 will quickly charge to that value. When the arm moves away from the contact, the capacitor will charge toward the 20 volts positive potential of the signal applied to terminal 101 since diode 141 will be biased in a forward or conducting direction. Since the potential of source 101 exceeds the potential of source 102, the flow of current will be that produced due to a signal applied to terminal 101 in accordance with well known electrical principles. Similarly, since terminals 101 and 102 are interconnected by diodes 141 and 142 with the diodes in series opposition, no current will flow between the two input signal sources at any time. The current flow into and out of capacitor 30 during the intermittent contact of arm 17 with contact 21 will produce a corresponding current flow in resistor 32 and, accordingly, an output signal depicted as wave form 227 will appear thereacross. It should be noted that a signal having a similar alternating current component appears at contact 21 and that the output signal may be taken from that point where the D. C. voltage component present would not prove undesirable.

When the arm 17 contacts contact 22 on alternate movements, capacitor 31 will be charged to the reference potential as previously described. When the arm moves away from the contact point however, the capacitor will not receive an additional charge since diode 151 is biased by its input signal in a non-conducting direction and the potential applied to input terminal 102 is equal to the reference potential and cannot produce any current flow in the circuit. Accordingly, no current will flow in resistor 33 and a zero voltage signal depicted as wave form 228 will appear between terminal 28 and ground. The signal appearing on output terminal 27 will thus indicate that a signal deviating in a positive direction from the reference signal has been applied to one of the input terminals and its amplitude will be proportional to the difference of potential between the maximum deviating input signal and the reference signal.

Referring now to Fig. 4 there are depicted wave forms similar to those of Fig. 2 except that the input signal applied to input terminal 101 is now assumed to be 20 volts positive, that applied to input terminal 102 is assumed to be 5 volts positive, while the reference potential is again taken as 10 volts positive as shown respectively by curves 2101, 2102 and 216. The circuit operation, insofar as the output signal appearing at the output terminal 27 is concerned, will be identical to that described in connection with Fig. 3. However, on alternate cycles, when the arm 17 is contacting contact 21, the relative amplitudes between the input signal applied to the terminal 102 and that of the potential appearing on previously charged capacitor 31 will be such as to bias the diode 152 in a conducting direction and current will flow out of the capacitor and through the load resistor 33. Accordingly, an alternating current output signal, depicted as wave form 228, will appear on the output terminal 28 in addition to the output signal appearing on output terminal 27. The presence of a signal on output terminal 28 will indicate that one of the applied input signals is less positive than the reference signal, while the amplitude of the signal will again be proportional to the difference in the amplitudes of the reference and least positive input signal. At the same time, the presence of a signal on terminal 27 will, as previously noted, indicate that one of the input signals is more positive than the reference signal, while the amplitude of this output signal will be proportional to the difference between such input signal and the reference signal.

While the circuit of the present invention maintains almost complete isolation between the input signal sources from which the signals to be compared to the reference are obtained, the loading effect on each of the sources individually may be reduced and the proportionality of the output signals to the voltage differential actually present enhanced by making the impedance of resistors 23 and 24 as large as possible. The response of the circuit may be further enhanced by making resistors 32 and 33 much smaller than resistors 23 and 24, respectively.

Figures 5, 6:
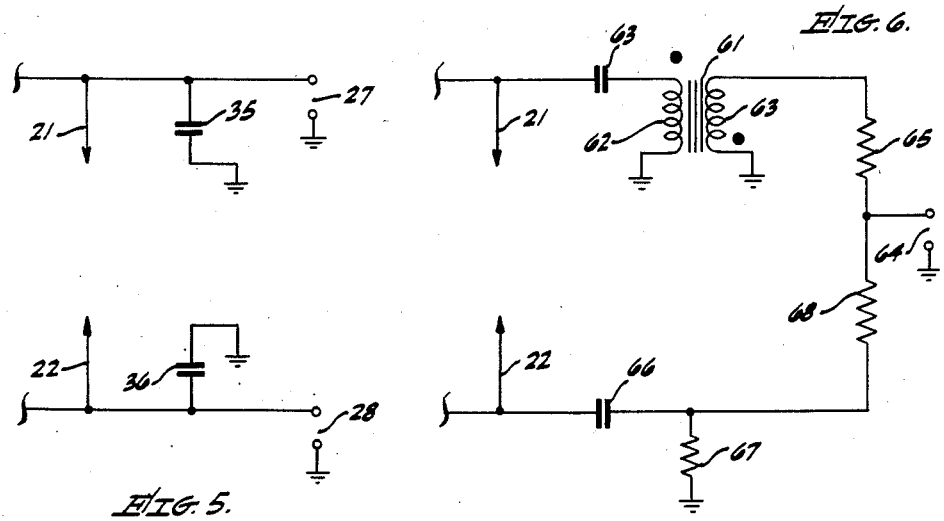
Figs. 5, 6 and 7 are circuit diagrams of embodiments of output circuits which may be found useful in conjunction with the embodiment of the voltage differential detector shown in Fig. 1.

Similarly, where the presence of a direct current component in the output signal is not undesirable, output coupling networks 25 and 26 may each be replaced by a single capacitor as shown in Fig. 5, wherein network 25 has been replaced by capacitor 35 and network 26 has been replaced by capacitor 36, each being connected to ground. Operation of the circuit will be substantially the same as that described in connection with the embodiment shown in Fig. 1, except that the output signals appearing at each of the output terminals 27 and 28 will now correspond to the signals previously depicted as appearing on contact points 21 and 22 as illustrated by curves 221 and 222 in Figs. 2–4.

Similarly, while the circuit of the present invention has been depicted in Fig. 1 as having three input terminals and has been described in terms of its response to two applied input signals, it should be understood that the number of input terminals utilized may be as few as one or as many as desired. Each additional input terminal would, of course, require the addition of two diodes, including one diode for each of groups 141 to 14$n$ and 151 to 15$n$, connected in the manner described.

Figure 7:
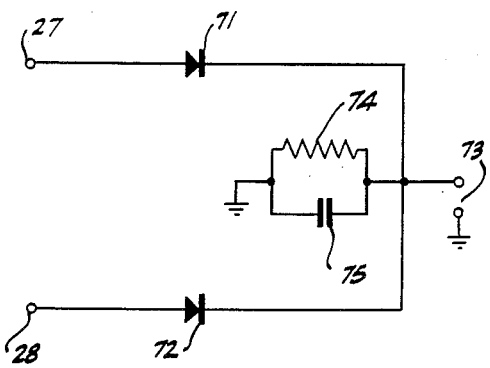

Similarly, while the operation of the present invention has been particularly described with reference to the use of alternating current output coupling networks, it should be understood that any number of other networks may be substituted for those shown and described. In particular, where a single input signal is to be compared to the reference source, the output coupling networks depicted in Figs. 3 and 4, of the aforementioned Edwards patent, will be found particularly useful. The response of such output networks will be substantially identical to that described in the cited patent, except that no significance can be attributed to the phase of the output signal of the present invention, since the signals appearing on both output terminals are ordinarily in phase.

Where it is desired to provide a single pair of output terminals for producing a single alternating current output signal whose phase is indicative of the relative polarity between an input signal and the reference signal, use may be made of an output circuit including means for reversing the phase of the signal appearing at one of contacts 21 or 22 and a summing circuit for summing this phase inverted signal and the signal appearing at the remaining contact point. Such a circuit is shown in Fig. 6 and includes a phase reversing transformer 61 having one end of its primary winding 62 arranged for connection to contact 21 by means of a coupling capacitor 63, the remaining end of the primary being grounded. One side of the secondary winding 63 of the transformer 61 is also grounded, while the remaining end of the secondary is connected to an output terminal 64 through a resistor 65. The signal appearing at the contact 22 is coupled to the output terminal 64 by means of a series connected capacitor 66 and resistor 68, a resistor 67 being connected between the common point of this RC circuit and ground. Output signals from this circuit may be taken between the output terminal 64 and ground. Where input signal conditions are such that an alternating current output signal appears at only one of contacts 21 or 22, the phase relationship between the signal appearing on the output terminal 64 and the alternating current signal driving electro-mechanical switch 18 will be indicative of the relative polarity of the input signal and the reference signal. Similarly, the amplitude of the output signal appearing at the output terminal 64 will be indicative of the relative amplitudes of the input and reference signal.

Where it is desired to provide a single direct current output signal whose amplitude is proportional to the relative amplitude of the input and reference signals without reference to the relative polarities of the signals, use may be made of the output circuit shown in Fig. 7. Such a network differs from that shown in Fig. 6 in that the network is arranged for connection to the output terminals 27 and 28 of Fig. 1, rather than to contact points 21 and 22 as was the case for the networks shown in Figs. 5 and 6. As shown in Fig. 7 such a circuit includes a pair of similarly poled diodes 71 and 72 for interconnecting output terminals 27 and 28 and a single output terminal 73. The rectified output signal appearing in the terminal 73 may be smoothed by means of a filtering network comprising a resistor 74 and a capacitor 75, each being connected between the output terminal 73 and ground. Output signals from the network may be taken between the terminal 73 and ground.

There has thus been described an electro-mechanical voltage differential detector which produces an output signal indicative of the maximum difference in amplitude between any number of input signals and a reference signal.

What is claimed is:

1. An electro-mechanical voltage differential detector for receiving a plurality of input signals and a reference signal and producing an output signal corresponding to the difference in amplitude between the input signal having the maximum absolute value and the reference signal, comprising: a plurality of input terminals for receiving a corresponding plurality of input signals; first and second load impedance elements; a first plurality of unidirectional conducting devices interconnecting each of said input terminals and said first load impedance element; a second plurality of unidirectional conducting devices interconnecting each of said input terminals and said second load impedance element; first and second output circuits connected individually to each of said first and second load impedance elements; and means for alternately applying the reference signal across one and the other of said first and second output circuits.

2. An electro-mechanical voltage differential detector for receiving a plurality of input signals and a reference signal and producing an output signal representative of the difference in amplitude between the input signal having the maximum absolute value and the reference signal, comprising: a plurality of input terminals for receiving a corresponding plurality of input signals; first and second load impedance elements; a first group of unidirectional conducting devices interconnecting each of said input terminals and said first load impedance element, each of said devices being poled to conduct in the same direction; a second group of unidirectional conducting devices interconnecting each of said input terminals and said second load impedance element, each of said devices of said second group being poled to conduct in the same direction but opposite from the direction of conduction of the devices of said first group; first and second output circuits connected to each of said first and second load impedance elements; and means for alternately applying the reference signal across one and the other of said first and second output circuits.

3. The electro-mechanical voltage differential detector set forth in claim 2 wherein each of said output circuits comprises a capacitor.

4. The electro-mechanical voltage differential detector set forth in claim 2 wherein each of said output circuits comprises an alternating-current coupling network for coupling each of said load impedance elements to a common output terminal.

5. The electro-mechanical voltage differential detector set forth in claim 2 wherein each of said output circuits comprises an alternating-current coupling network for individually coupling each of said load impedance elements to one end of a first and a second resistor, the remaining end of each of said resistors being connected to a common output terminal.

6. The electro-mechanical voltage differential detector set forth in claim 2 wherein each of said output circuits comprises a further unidirectional conducting device for coupling each of said load impedance elements to a common output terminal, and including filtering means connected to said output terminal.

7. An electro-mechanical voltage differential detector for receiving an input signal and a reference signal and producing an output signal corresponding to the difference in amplitude between said input signal and the reference signal, said output signal appearing in one of two output circuits in accordance with the sense of the difference between said signals, comprising: an input terminal; first and second load impedance elements, each having first and second ends; first and second unidirectional conducting devices for connecting said input terminal to the first end of each of said first and second load impedance elements, said devices being poled to conduct in opposite directions; first and second output circuits connected to the second ends of each of said first and second load impedance elements; and means for alternately applying said reference signal to the second end of each of said load impedance elements.

8. The electro-mechanical voltage differential detector set forth in claim 7 wherein said first and second output circuits each comprise a capacitor.

9. The electro-mechanical voltage differential detector set forth in claim 7 wherein each of said first and second output circuits comprises an alternating-current coupling network.

10. The electro-mechanical voltage differential detector set forth in claim 7 wherein said first output circuit comprises a phase reversing network for reversing the phase of the signal appearing at the second end of said first load impedance element, and including means for combining the phase reversed signal and the signal passed by said second output circuit.

No references cited.